(12) United States Patent
Kim et al.

(10) Patent No.: US 11,328,870 B2
(45) Date of Patent: May 10, 2022

(54) ELECTRONIC COMPONENT

(71) Applicant: SAMSUNG ELECTRO-MECHANICS CO., LTD., Suwon-si (KR)

(72) Inventors: Ho Yoon Kim, Suwon-si (KR); Yeong Lim Kwon, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 18 days.

(21) Appl. No.: 16/852,808

(22) Filed: Apr. 20, 2020

(65) Prior Publication Data

US 2021/0202174 A1 Jul. 1, 2021

(30) Foreign Application Priority Data

Dec. 30, 2019 (KR) .......................... 10-2019-0178486

(51) Int. Cl.
*H01G 2/06* (2006.01)
*H01G 4/008* (2006.01)
(Continued)

(52) U.S. Cl.
CPC ............... *H01G 4/30* (2013.01); *H01G 2/065* (2013.01); *H01G 4/008* (2013.01); *H01G 4/012* (2013.01);
(Continued)

(58) Field of Classification Search
CPC .......... H01G 2/065; H01G 2/06; H01G 4/008; H01G 4/012; H01G 4/1218; H01G 4/2325;
(Continued)

(56) References Cited

U.S. PATENT DOCUMENTS

2004/0066589 A1* 4/2004 Togashi ................ H01G 2/065
361/15
2004/0240146 A1* 12/2004 Kayatani ............... H01G 2/103
361/306.3
(Continued)

FOREIGN PATENT DOCUMENTS

KR 10-2014-0053562 A 5/2014
KR 10-2014-0107622 A 9/2014
(Continued)

OTHER PUBLICATIONS

*KSR INTERNATIONAL CO. v. TELEFLEX INC.* pp. 1-24 Apr. 2007.*
First Office Action dated Nov. 11, 2020 in Korean Patent Application No. 10-2019-0178486 (English translation).

*Primary Examiner* — Timothy J Thompson
*Assistant Examiner* — Guillermo J Egoavil
(74) *Attorney, Agent, or Firm* — Morgan, Lewis & Bockius LLP (57) ABSTRACT

An electronic component includes a multilayer capacitor including a capacitor body having first to sixth surfaces, and first and second external electrodes; and an interposer including an interposer body and first and second external terminals; and the capacitor body includes a plurality of dielectric layers and a plurality of first and second internal electrodes, the first and second internal electrodes are exposed through the third and fourth surfaces of the capacitor body, respectively, and the interposer further includes first and second solder fillet limiting layers disposed on upper sides of both surfaces of each of the first and second external terminals in the first direction, respectively.

18 Claims, 6 Drawing Sheets

(51) Int. Cl.
*H01G 4/012* (2006.01)
*H01G 4/12* (2006.01)
*H01G 4/232* (2006.01)
*H01G 4/30* (2006.01)

(52) U.S. Cl.
CPC ......... *H01G 4/1218* (2013.01); *H01G 4/2325* (2013.01)

(58) Field of Classification Search
CPC ............ H01G 4/30; H01G 4/12; H01G 4/232; H05K 1/141; H05K 3/3442; H05K 2201/049; H05K 2201/09181; H05K 2201/10015; H05K 2201/2045
USPC ......... 361/306.3, 301.4, 321.4, 321.2, 321.5; 174/260
See application file for complete search history.

(56) References Cited

U.S. PATENT DOCUMENTS

| | | | |
|---|---|---|---|
| 2013/0284507 A1* | 10/2013 | Hattori | H05K 1/181 |
| | | | 174/260 |
| 2014/0116766 A1* | 5/2014 | Jeon | H05K 3/3442 |
| | | | 361/321.2 |
| 2014/0284089 A1* | 9/2014 | Hattori | H01G 4/232 |
| | | | 174/258 |
| 2015/0043125 A1 | 2/2015 | Park et al. | |
| 2019/0066919 A1* | 2/2019 | Son | H01G 2/06 |

FOREIGN PATENT DOCUMENTS

| | | |
|---|---|---|
| KR | 10-2015-0018650 A | 2/2015 |
| KR | 10-2019-0023551 A | 3/2019 |
| KR | 10-1994747 B1 | 7/2019 |

\* cited by examiner

ELECTRONIC COMPONENT

CROSS-REFERENCE TO RELATED APPLICATION(S)

This application claims benefit of priority to Korean Patent Application No. 10-2019-0178486 filed on Dec. 30, 2019 in the Korean Intellectual Property Office, the disclosure of which is incorporated herein by reference in its entirety.

BACKGROUND

1. Field

The present disclosure relates to an electronic component.

2. Description of Related Art

Generally, a chip-type passive electronic component mounted using a surface mount technology (SMT) may be mounted on a printed circuit board (PCB) and may be connected to an external terminal using solder.

A PCB has a low modulus and a thin thickness such that a PCB may easily be bent or curved by external force.

When a board is bent, stress may be applied to an electronic component mounted on a surface of the board through solder, and accordingly, mechanical defects and property degradation may occur in the electronic component.

As an electronic device has been designed to have a reduced thickness, a thickness of an electronic component has been reduced, and accordingly, an electronic component may be deteriorated due to warpage of the board.

Particularly, an electronic component used for a vehicle may require a relatively high degree of mechanical reliability. Accordingly, there has been increased demand for an electronic component having improved durability against warpage of a board.

SUMMARY

An aspect of the present disclosure is to provide an electronic component having strong durability against warpage of a board.

According to an aspect of the present disclosure, an electronic component includes a multilayer capacitor including a capacitor body having first and second surfaces opposing each other, third and fourth surfaces connected to the first and second surfaces and opposing each other, fifth and sixth surfaces connected to the first and second surfaces and to the third and fourth surfaces and opposing each other, and first and second external electrodes disposed on both ends of the capacitor body in a first direction in which the third and fourth surfaces of the capacitor body are connected to each other, respectively; and an interposer including an interposer body and first and second external terminals disposed on both ends of the interposer body taken in the first direction, and disposed on a side of the first surface of the multilayer capacitor, the capacitor body includes a plurality of dielectric layers and a plurality of first and second internal electrodes alternately disposed with the dielectric layer interposed therebetween in a second direction in which the fifth and sixth surfaces of the capacitor body are connected to each other, the first and second internal electrodes are exposed through the third and fourth surfaces of the capacitor body, respectively, and the interposer further includes first and second solder fillet limiting layers disposed on upper sides of both surfaces of each of the first and second external terminals in the first direction, respectively.

The first external terminal may include a first bonding portion disposed in the interposer body and connected to the first external electrode, a first mounting portion disposed in the interposer body and opposing the first bonding portion in the second direction, and a first connection portion disposed in the interposer body and connecting the first bonding portion to the first mounting portion, the second external terminal may include a second bonding portion disposed in the interposer body and connected to the second external electrode, a second mounting portion disposed in the interposer body and opposing the second bonding portion in the second direction, and a second connection portion disposed in the interposer body and connecting the second bonding portion to the second mounting portion, the first solder fillet limiting layer may be disposed on an external surface of an upper portion of the first connection portion and is elongated in the second direction of the capacitor body, and the second solder fillet limiting layer may be disposed on an external surface of an upper portion of the second connection portion and is elongated in the second direction.

The first and second solder fillet limiting layers may be formed of an organic material.

A conductive adhesive may be disposed in a region between the first and second external electrodes and a region between the first and second bonding portions.

The conductive adhesive may be a solder having a high melting point.

The first and second external electrodes may have cross-sectional surfaces having a "[" shape and a "]" shape, respectively.

The interposer body may be formed of alumina.

The first and second external electrodes include first and second connection portions disposed on the third and fourth surfaces of the capacitor body, respectively, and first and second band portions extending from the first and second connection portions to a portion of the first surface of the capacitor body, respectively.

The electronic component may further include first and second plating layers disposed on surfaces of the first and second external electrodes, respectively, and in the first and second external terminals, each of the first and second bonding portions and the first and second mounting portions may include a conductive layer disposed on an internal side and a plating layer disposed on an external side, and each of the first and second connection portions may only include a plating layer.

The electronic component may further include third and fourth plating layers configured to cover the first and second plating layers, respectively; and fifth and sixth plating layers configured to cover the first and second external terminals, respectively, and to not be disposed on the first and second solder fillet limiting layers.

The first and second external electrodes may include copper (Cu), each of the first and second plating layers may have a dual layer structure including a nickel (Ni) plating layer disposed on an internal side and a tin (Sn) plating layer disposed on an external side, the conductive layer disposed on the internal side of each of the first and second bonding portions and the first and second mounting portions may include cupper, each of the plating layers of the first and second bonding portions and of the first and second mounting portions and the first and second connection portions may have a dual layer structure including a nickel (Ni) plating layer disposed on an internal side and a tin (Sn)

plating layer disposed on an external side, and the third and fourth plating layers and fifth and sixth plating layers may be configured as tin plating layers.

A length of the interposer taken in the first direction may be less than a length of the multilayer capacitor taken in the first direction, and a length of the interposer taken in the second direction may be less than a length of the multilayer capacitor taken in the second direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Accordingly, shapes and sizes of elements in the drawings may be exaggerated for clarity of description, and elements indicated by the same reference numeral are same elements in the drawings.

Further, throughout the specification, it will be understood that when a portion "includes" an element, it can further include another element, not excluding another element, unless otherwise indicated.

In the drawings, an X direction, a Y direction, and a Z direction may indicate a length direction, a width direction, and a thickness direction of a multilayer capacitor and an interposer, respectively.

The Y direction may be the same as a layering direction in which dielectric layers are layered.

Figure 1:
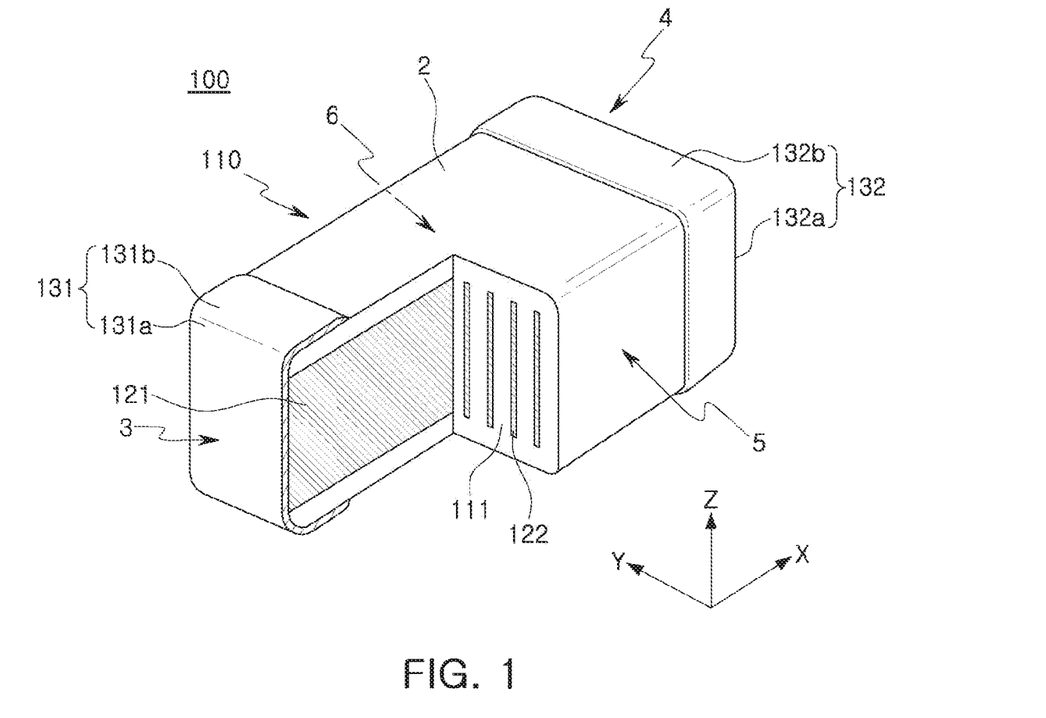
FIG. 1 is a perspective diagram illustrating a multilayer capacitor applied to an electronic component, a portion of which is partially cut out, according to an example embodiment of the present disclosure.
Figure 2A:
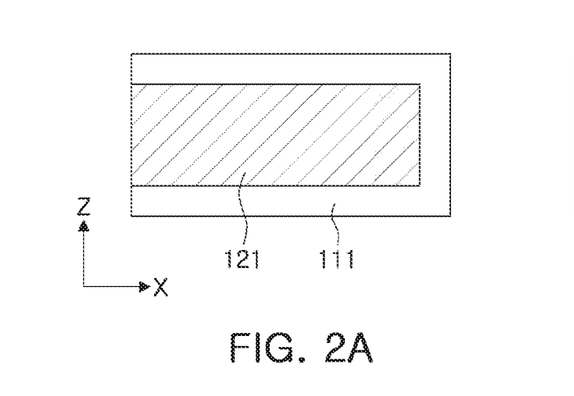
FIGS. 2A and 2B are plan diagrams illustrating first and second internal electrodes of the multilayer capacitor illustrated in FIG. 1.
Figure 2B:
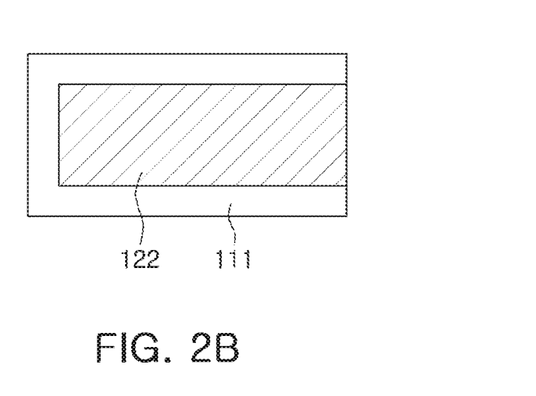

FIG. 1 is a perspective diagram illustrating a multilayer capacitor applied to an electronic component, a portion of which is partially cut out, according to an example embodiment. FIGS. 2A and 2B are plan diagrams illustrating first and second internal electrodes of the multilayer capacitor illustrated in FIG. 1.

A structure of a multilayer capacitor 100 applied to an electronic component of the example embodiment will be described with reference to FIGS. 1 to 2B.

The multilayer capacitor 100 in the example embodiment may include a capacitor body 110 and first and second external electrodes 131 and 132 disposed on both ends of the capacitor body 110 in the X direction.

The capacitor body 110 may be formed by layering a plurality of dielectric layers 111 in the Y direction and performing a sintering process. A boundary between adjacent dielectric layers 111 of the capacitor body 110 may be integrated such that it may be difficult to identify the boundary without using a scanning electron microscope (SEM).

The capacitor body 110 may include a plurality of dielectric layers 111, and a plurality of first and second internal electrodes 121 and 122 alternately disposed in the Y direction with the dielectric layer 111 interposed therebetween and having different polarities.

A shape of the capacitor body 110 is not limited to any particular shape, and may have a hexahedral shape. The capacitor body 110 may include first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2 and the third and fourth surfaces 3 and 4 and opposing each other in the Y direction.

The capacitor body 110 may include an active region as a portion contributing to forming capacitance of the capacitor, and cover regions formed on and below the active region in the Y direction as margin portions.

The cover regions may have a material and a configuration the same as those of the dielectric layers 111 except that the cover regions do not include an internal electrode.

The cover regions may be formed by disposing a single dielectric layer or layering two or more dielectric layers on both sides of the active region in the Y direction, and may prevent damages to the first and second internal electrodes 121 and 122 caused by physical or chemical stress.

The dielectric layer 111 may include ceramic powder, barium titanate ($BaTiO_3$) based ceramic powder, for example.

As the $BaTiO_3$ ceramic powder, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca or Zr is partially solute may be used, but an example embodiment thereof is not limited thereto.

The dielectric layer 111 may further include ceramic additives, organic solvents, plasticizers, coupling agents, dispersing agents, and the like, in addition to the ceramic powder.

Ceramic additive may include, for example, a transition metal oxide or a transition metal carbide, a rare earth element, magnesium (Mg) or aluminum (Al), and the like.

The first and second internal electrodes 121 and 122 may be provided with different polarities. The first and second internal electrodes 121 and 122 may be disposed on the dielectric layer 111 and may be layered in the Y direction, and may be alternately disposed in the capacitor body 110 in the Y direction with the dielectric layer 111 interposed therebetween.

The first and second internal electrodes 121 and 122 may be electrically insulated from each other by the dielectric layer 111 interposed therebetween.

One of the ends of the first and second internal electrodes 121 and 122 may be exposed through the third and fourth surfaces 3 and 4 of the capacitor body 110, respectively.

The ends of the first and second internal electrodes 121 and 122 alternately exposed through the third and fourth surfaces 3 and 4 of the capacitor body 110 may be electrically connected to the first and second external electrodes 131 and 132 disposed on ends of the capacitor body 110 opposing each other in the X direction.

Accordingly, when a certain level of voltage is applied to the first and second external electrodes 131 and 132, an electric charge may be accumulated in a region between the first and second internal electrodes 121 and 122.

Capacitance of the multilayer capacitor 100 may be proportional to an area of overlap between the first and second internal electrodes 121 and 122 overlapping each other in the Y direction in the active region.

A material of the first and second internal electrodes 121 and 122 is not limited to any particular material, and may be formed using a conductive paste including one or more of noble materials such as platinum (Pt), palladium (Pd), palladium-silver (Pd—Ag) alloy, and the like, nickel (Ni), and copper (Cu).

As a method of printing the conductive paste, a screen-printing method or a gravure printing method may be used, but an example of the method is not limited thereto.

The first and second external electrodes 131 and 132 may be provided with voltages having different polarities, may be disposed on both ends of the capacitor body 110 in the X direction, and may be electrically connected to exposed ends of the first and second internal electrodes 121 and 122, respectively.

The first external electrode 131 may include a first connection portion 131a and a first band portion 131b.

The first connection portion 131a may be disposed on the third surface 3 of the capacitor body 110, and may be in contact with one end of the first internal electrode 121 externally exposed through the third surface 3 of the capacitor body 110 and may electrically connect the first internal electrode 121 to the first external electrode 131.

The first band portion 131b may be a portion extending from the first connection portion 131a to a portion of the first surface 1 of the capacitor body 110 and may be connected to a first external terminal of an interposer.

The first band portion 131b may further extend from the first connection portion 131a to a portion of each of the second, fifth, and sixth surfaces 2, 5, and 6 of the capacitor body 110 to improve adhesion strength.

The first external electrode 131 may be formed of a material including copper (Cu).

A first plating layer 133 may be disposed on a surface of the first external electrode 131 to cover the first external electrode 131.

The first plating layer 133 may have a dual layer structure including a nickel (Ni) plating layer disposed on an internal side and a tin (Sn) plating layer disposed on an external side.

The second external electrode 132 may include a second connection portion 132a and a second band portion 132b.

The second connection portion 132a may be disposed on the fourth surface 4 of the capacitor body 110, may be in contact with one end of the second internal electrode 122 externally exposed through the fourth surface 4 of the capacitor body 110, and may electrically connect the second internal electrode 122 to the second external electrode 132.

The second band portion 132b may be a portion extending from the second connection portion 132a to a portion of the first surface 1 of the capacitor body 110 and may be connected to a second external terminal of the interposer.

The second band portion 132b may further extend from the first connection portion 131a to a portion of each of the second, fifth, and sixth surfaces 2, 5, and 6 of the capacitor body 110 to improve adhesion strength.

The second external electrode 132 may be formed of a material including copper (Cu).

A second plating layer 134 may be disposed on a surface of the second external electrode 132 to cover the second external electrode 132.

The second plating layer 134 may have a dual layer structure including a nickel (Ni) plating layer disposed on an internal side and a tin (Sn) plating layer disposed on an external side.

Figure 3:
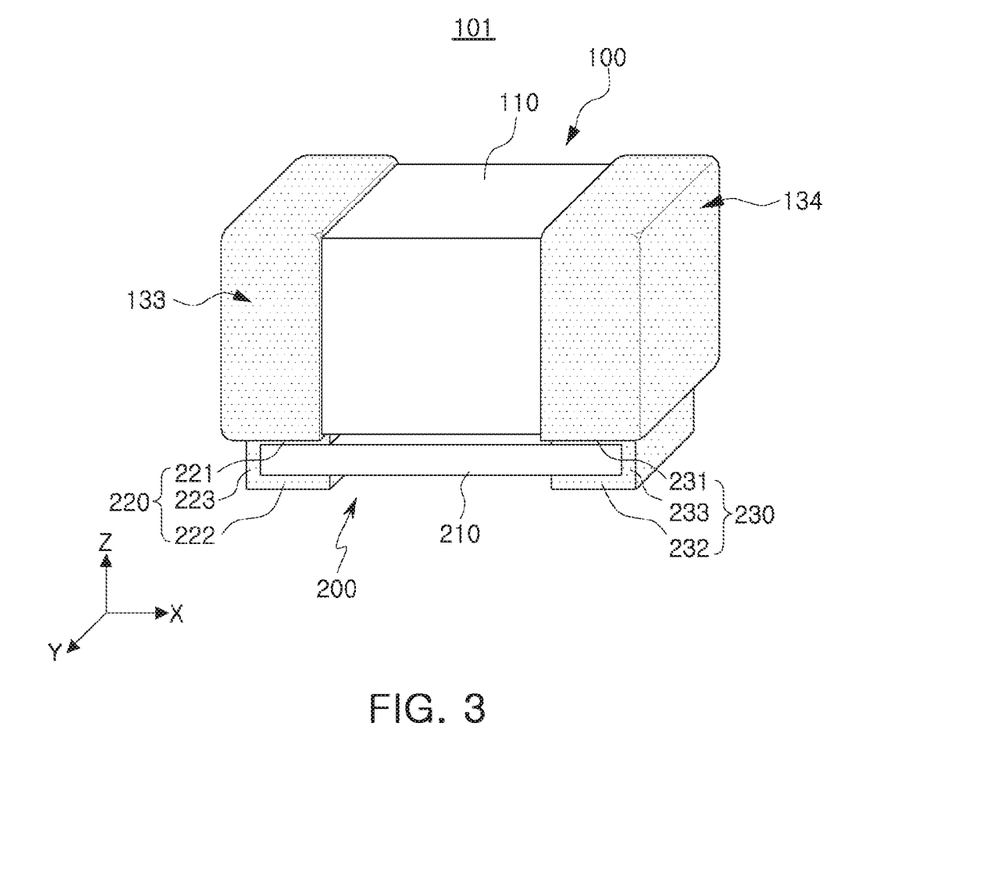
FIG. 3 is a perspective diagram illustrating an electronic component from which a solder fillet limiting layer is removed according to an example embodiment of the present disclosure.
Figure 4:
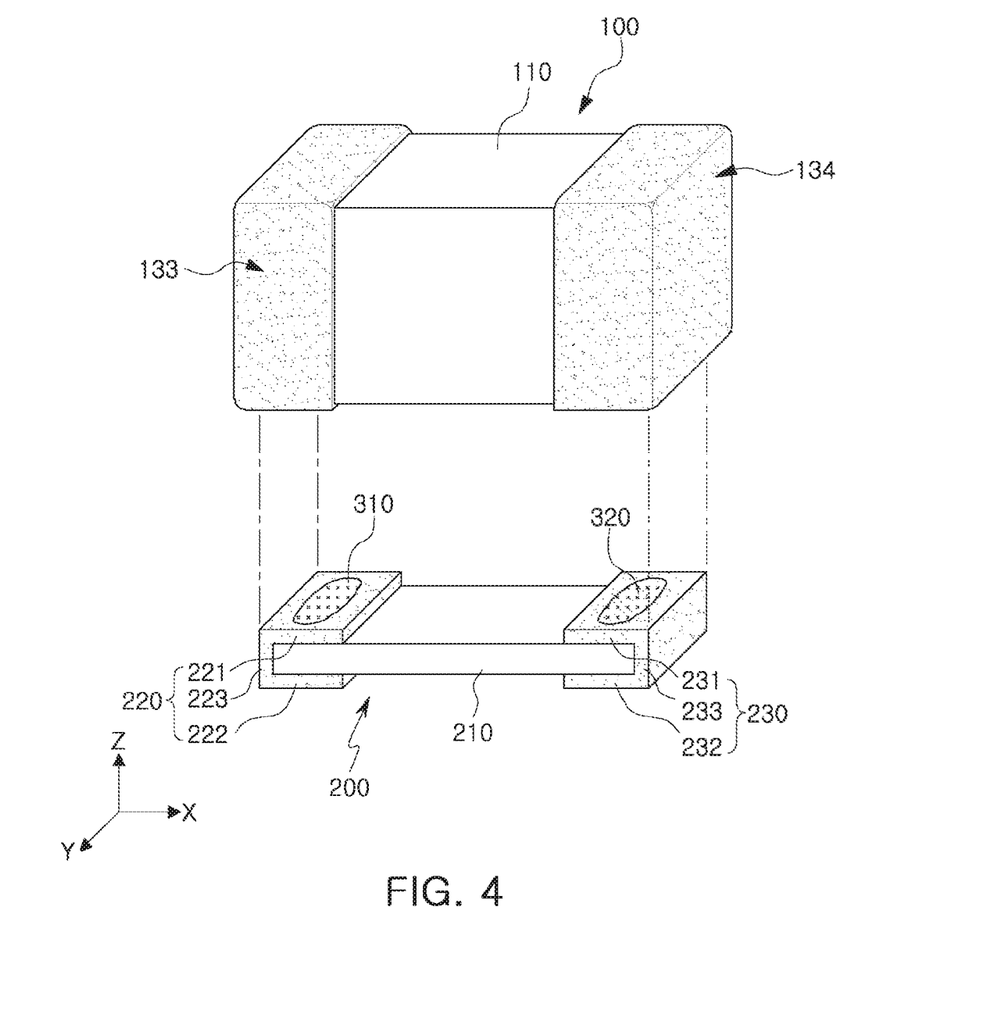
FIG. 4 is a perspective diagram illustrating the electronic component illustrated in FIG. 3.
Figure 5:
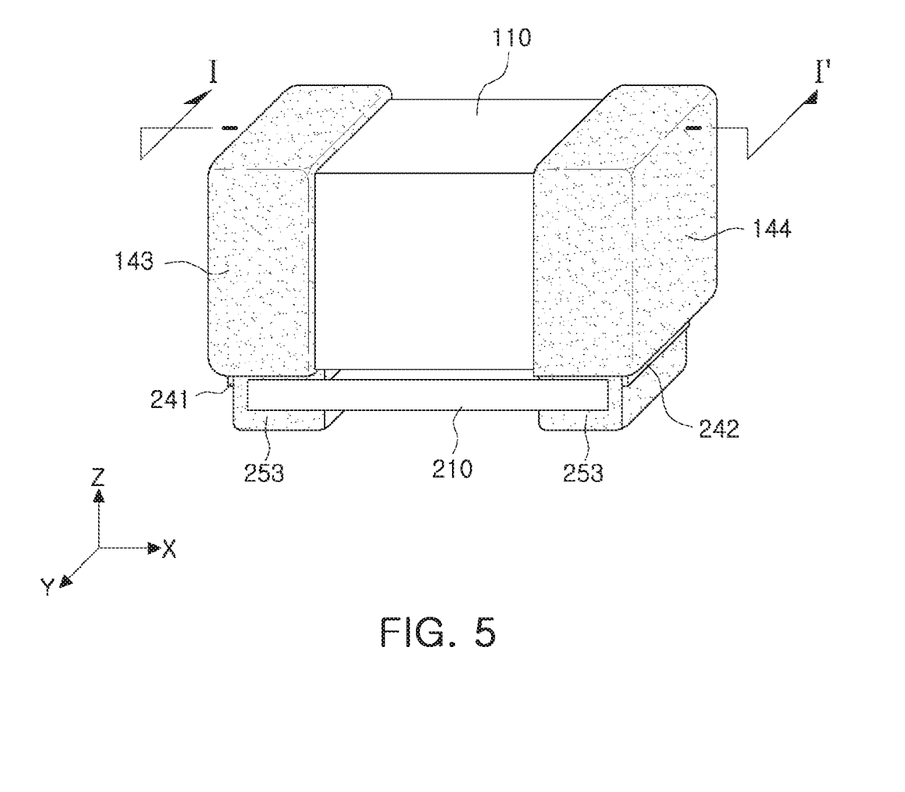
FIG. 5 is a perspective diagram illustrating an electronic component according to an example embodiment of the present disclosure.
Figure 6:
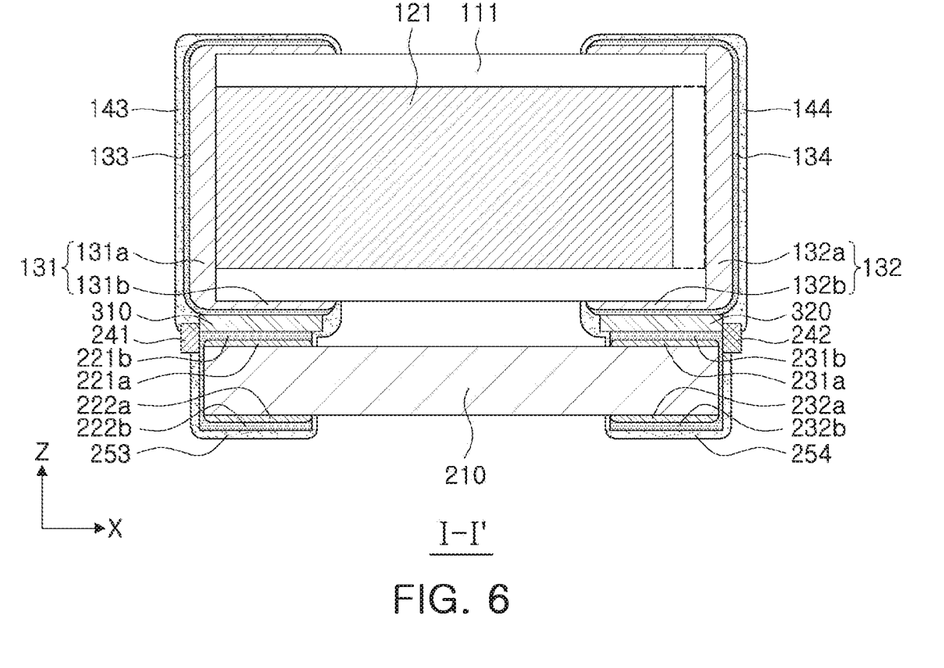
FIG. 6 is a cross-sectional diagram taken along line I-I' in FIG. 5.

FIG. 3 is a perspective diagram illustrating an electronic component from which a solder fillet limiting layer is removed according to an example embodiment. FIG. 4 is a perspective diagram illustrating the electronic component illustrated in FIG. 3. FIG. 5 is a perspective diagram illustrating an electronic component according to an example embodiment. FIG. 6 is a cross-sectional diagram taken along line I-I' in FIG. 5.

Referring to FIGS. 3 to 6, an electronic component 101 in the example embodiment may include a multilayer capacitor 100 and an interposer 200 disposed on a first surface 1 of the multilayer capacitor 100.

The interposer 200 may include an interposer body 210, first and second external terminals 220 and 230 disposed on both ends of the interposer body 210 opposing each other in the X direction, and first and second solder fillet limiting layers 241 and 242.

A length of the interposer 200 taken in the X direction may be less than a length of the multilayer capacitor 100 taken in the X direction, and a length of the interposer 200 taken in the Y direction may be less than a length of the multilayer capacitor 100 taken in the Y direction.

The interposer body 210 may be formed of a ceramic material. For example, the interposer body 210 may be formed of alumina ($Al_2O_3$).

The first and second external terminals 220 and 230 may be provided with voltages having different polarities, and may be connected to first and second band portions 131b and 132b of first and second external electrodes 131 and 132, respectively.

The first external terminal 220 may include a first bonding portion 221, a first mounting portion 222, and a first connection portion 223.

The first bonding portion 221 may be disposed on an upper surface of the interposer body 210, and one end of the first bonding portion 221 may be exposed through one surface of the interposer body 210 in the X direction, and the first bonding portion 221 may be connected to the first band portion 131b of the first external electrode 131.

The first bonding portion 221 may include a conductive layer 221a disposed on an internal side and a plating layer 221b disposed on an external side.

The conductive layer 221a disposed on an internal side may be formed of a material including copper, and the plating layer 221b disposed on an external side may have a dual layer structure including a nickel plating layer disposed on an internal side and a tin plating layer disposed on an external side.

The first mounting portion 222 may be disposed on a lower surface of the interposer body 210 and may be configured to oppose the first bonding portion 221 in the Z direction. The first mounting portion 222 may work as a terminal when the multilayer capacitor is mounted on a board.

The first mounting portion 222 may include a conductive layer 222a disposed on an internal side and a plating layer 222b disposed on an external side.

The conductive layer 222a disposed on an internal side may be formed of a material including copper, and the plating layer 222b disposed on an external side may have a dual layer structure including a nickel plating layer disposed on an internal side and a tin plating layer disposed on an external side.

The first connection portion 223 may be disposed on one surface of the interposer body 210 in the X direction, and may connect an end of the first bonding portion 221 to an end of the first mounting portion 222.

The first connection portion 223 may only include a plating layer. For example, the external plating layer 222b may have a dual layer structure including a nickel plating layer disposed on an internal side and a tin plating layer disposed on an external side.

The first connection portion 223 may be connected to the plating layers 221b and 222b disposed on the external sides of the first bonding portion 221 and the first mounting portion 222.

Accordingly, the first external terminal 220 may have an X-Z cross-sectional surface having a "[" shape.

A first conductive adhesive 310 may be disposed between the first bonding portion 221 and the first band portion 131b and may mechanically and electrically bond the first bonding portion 221 and the first band portion 131b.

The first conductive adhesive 310 may be formed of a solder having a high melting point.

The solder having a high melting point may include at least one of antimony (Sb), cadmium (Cd), lead (Pb), zinc (Zn), aluminum (Al), and copper (Cu).

The second external terminal 230 may include a second bonding portion 231, a second mounting portion 232, and a second connection portion 233.

The second bonding portion 231 may be disposed on an upper surface of the interposer body 210, and one end of the second bonding portion 231 may be exposed through the other surface of the interposer body 210 in the X direction, and the second bonding portion 231 may be connected to the second band portion 132b of the second external electrode 132.

The second bonding portion 231 may include a conductive layer 231a disposed on an internal side and a plating layer 231b disposed on an external side.

The conductive layer 231a disposed on an internal side may be formed of a material including copper, and the plating layer 231b disposed on an external side may have a dual layer structure including a nickel plating layer disposed on an internal side and a tin plating layer disposed on an external side.

The second mounting portion 232 may be disposed on a lower surface of the interposer body 210 and may be configured to oppose the second bonding portion 231 in the Z direction. The second mounting portion 232 may work as a terminal when the multilayer capacitor is mounted on a board.

The second mounting portion 232 may include a conductive layer 232a disposed on an internal side and a plating layer 232b disposed on an external side.

The conductive layer 232a disposed on an internal side may be formed of a material including copper, and the plating layer 232b disposed on an external side may have a dual layer structure including a nickel plating layer disposed on an internal side and a tin plating layer disposed on an external side.

The second connection portion 233 may be disposed on the other surface of the interposer body 210 in the X direction, and may connect an end of the second bonding portion 231 to an end of the second mounting portion 232.

The second mounting portion 232 may only include a plating layer. For example, the second mounting portion 232 may have a dual layer structure including a nickel plating layer disposed on an internal side and a tin plating layer disposed on an external side.

The second mounting portion 232 may be connected to the plating layers 231b and 232b disposed on the external sides of the second bonding portion 231 and the second mounting portion 232.

Accordingly, the second external terminal 230 may have an X-Z cross-sectional surface having a "]" shape.

A second conductive adhesive 320 may be disposed between the second bonding portion 231 and the second band portion 132b and may mechanically and electrically bond the second bonding portion 231 and the second mounting portion 232.

The second conductive adhesive 320 may be formed of a solder having a high melting point.

The first solder fillet limiting layer 241 may be disposed on an upper side of a surface of the first external terminal 220 in the X direction.

Accordingly, in the example embodiment, the first solder fillet limiting layer 241 may be disposed on an external surface of an upper portion of the first connection portion 223.

The first solder fillet limiting layer 241 may be elongated in the Y direction, and a length of the first solder fillet limiting layer 241 taken in the Y direction may be the same as a length of the first connection portion 223 taken in the Y direction.

The second solder fillet limiting layer 242 may be disposed on an upper side of a surface of the second external terminal 230 in the X direction.

Accordingly, in the example embodiment, the second solder fillet limiting layer 242 may be disposed on an external surface of an upper portion of the second connection portion 233.

The second solder fillet limiting layer 242 may be elongated in the Y direction, and a length of the second solder fillet limiting layer 242 taken in the Y direction may be the same as a length of the second connection portion 233 taken in the Y direction.

The first and second solder fillet limiting layers 241 and 242 may be formed of an organic material. For example, the first and second solder fillet limiting layers 241 and 242 may be formed of an insulating material such as, for example, a polyimide.

In the example embodiment, the electronic component 101 may further include third and fourth plating layers 143 and 144 and fifth and sixth plating layers 253 and 254.

The third and fourth plating layers 143 and 144 may be configured respectively to cover first and second plating layers 133 and 134 of the first and second external electrodes 131 and 132.

The third and fourth plating layers 143 and 144 may be formed of a tin plating layer.

The fifth and sixth plating layers 253 and 254 may be configured respectively to cover the first and second external terminals 220 and 230, and configured to not cover the first and second solder fillet limiting layers 241 and 242.

The fifth and sixth plating layers 253 and 254 may be configured as tin plating layers.

Accordingly, the plating layers may not be disposed in a region in which the first and second solder fillet limiting layers 241 and 242 are disposed.

While the electronic component 101 is mounted on a board, when voltages having different polarities are applied to the first and second external electrodes 131 and 132, the capacitor body 110 may expand and contact in the Z direction by an inverse piezoelectric effect.

Then, both ends of the first and second external electrodes 131 and 132 may expand and contact in a direction opposite to the Z direction in which the capacitor body 110 expands and contacts by a Poisson effect, and the expansion and the reduction may generate vibrations.

The vibrations may be transmitted to the board through the first and second external electrodes 131 and 132 and the first and second external terminals 220 and 230, and acoustic sound may be radiated from the board, which may become acoustic noise.

Figure 7:
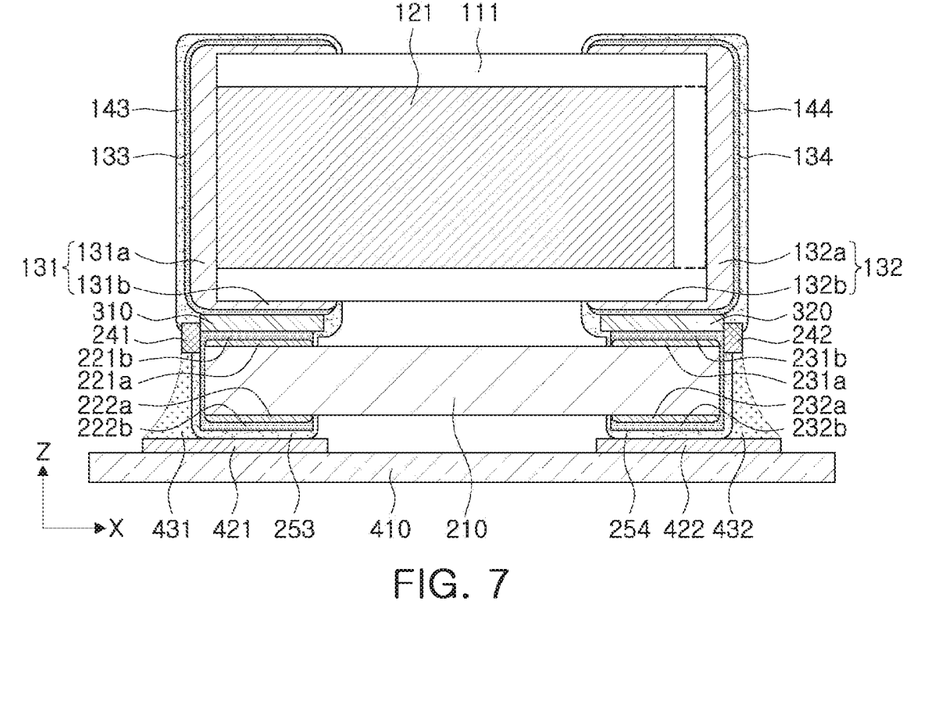
FIG. 7 is a cross-sectional diagram illustrating an example in which the electronic component illustrated in FIG. 5 is mounted on a board.

Referring to FIG. 7, a board 410 on which the electronic component 101 is mounted may include first and second electrode pads 421 and 422 disposed on one surface of the board 410, and the first and second mounting portions 222 and 232 of the first and second external terminals 220 and 230 may be connected to the first and second electrode pads 421 and 422, respectively.

The interposer 200 may be disposed on the first surface 1 side of the multilayer capacitor 100 in a mounting direction, and may absorb vibrations transmitted from the multilayer capacitor 100 to the board 410, thereby reducing acoustic noise.

The interposer may also reduce warpage stress transmitted from the board to the multilayer capacitor such that warpage strength of the multilayer capacitor may be reduced. In this case, warpage strength of the multilayer capacitor may be reduced by preventing warpage stress of the board from being directly transmitted to the electronic component.

To completely prevent the warpage stress of the board from being transmitted, the solder connected to the board may be configured to not be directly connected to the multilayer capacitor.

To this end, in a general electronic component, an interposer is configured to have an increased thickness or to have a horizontal length and a width greater than a size of a multilayer capacitor. In this case, however, a volume of the electronic component may also increase.

In the example embodiment, the first and second electrode pads 421 and 422 may be bonded to the first and second mounting portions 222 and 232 by solders 431 and 432, respectively.

The interposer 410 may include the first and second solder fillet limiting layers 241 and 242 disposed on upper sides of the first and second connection portions 223 and 233, respectively.

The solder may be dispersed through the plating layer disposed on a surface of the external terminal of the interposer and the plating layer disposed on a surface of the external electrode of the multilayer capacitor. As illustrated in FIG. 6, the solder fillet limiting layers may disconnect the plating layer of the external terminal from the plating layer of the multilayer capacitor.

Accordingly, heights of solder fillets 431 and 432 may be less than a height of the interposer body 210 in the Z direction, and accordingly, the solder fillets 431 and 432 may be prevented from being dispersed to the first and second external electrodes 131 and 132 of the multilayer capacitor 100.

As the interposer 200 may not be affected by warpage stress of the board 410, warpage stress of the board 410 may be prevented from being transmitted to the multilayer capacitor 100, and even when a size of the interposer 200 is less than a size of the multilayer capacitor 100, warpage strength of the multilayer capacitor 100 may improve.

When warpage strength of the multilayer capacitor 100 improves, cracks and property degradation of the multilayer capacitor 100 may be prevented.

Also, when the solder fillets 431 and 432 are not dispersed to the first and second external electrodes 131 and 132, vibrations transmitted from the multilayer capacitor 100 to the board 410 may be reduced such that acoustic noise may be reduced.

Experimental Example

A multilayer capacitor having a size of 2.0×1.2 mm and of a 22 μF and 25V level was manufactured, and a ceramic interposer having a size of 1.7×1.2×0.5 mm was bonded using a solder having a high melting point, thereby manufacturing an electronic component having a structure similar to the structure illustrated in FIG. 6.

In an embodiment, a solder fillet limiting layer was disposed on a connection portion of the interposer before a plating process during a manufacturing process, and a plating layer was not formed on the portion.

In a comparative example, a solder fillet limiting layer was not disposed such that a plating layer of an external terminal of the interposer was connected to a plating layer of an external electrode of a multilayer capacitor.

A warpage strength test was carried out as below.

The electronic components were attached to boards used for a test using a solder, pressure was applied at a speed of 1 mm/sec until an amount of change in curvature reached 10 mm and the pressure was maintained for 10 seconds. While the board was pressured, capacitance was measured and a capacitance change rate for an initial value was obtained.

A rated current was applied in a temperature and humidity chamber having a temperature of 85±2° C. and relative humidity of 80 to 85% for 24 hours.

When a high temperature and high humidity test was completed, the electronic components were taken out at a room temperature, and some of the electronic components were placed at room temperature for 22 to 26 hours and IR was measured. As for the remaining electronic components, a heat treatment was performed to the remaining electronic components at 150° C. (+0° C./−10° C.) for 1 hour and were placed at room temperature for 22 to 26 hours, and IR was measured.

Figure 8:
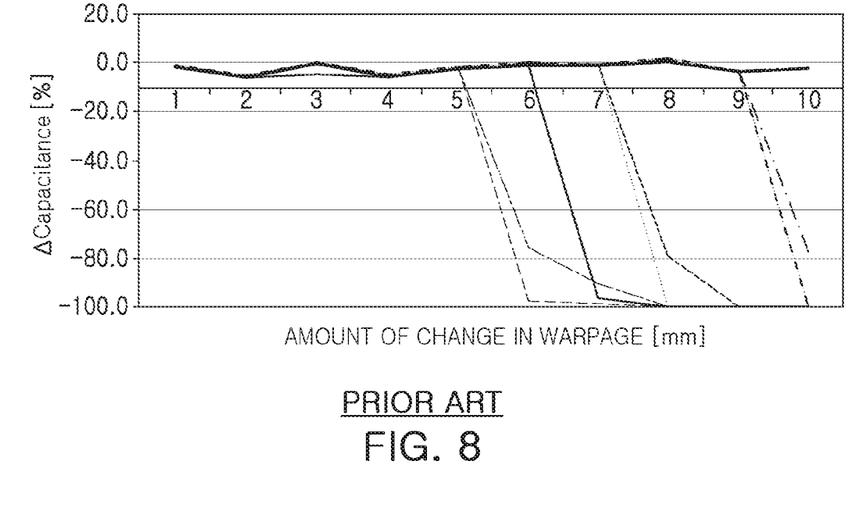
FIG. 8 is a graph illustrating a result of a warpage strength test of an electronic component of a prior art which does not include a solder fillet limiting layer.
Figure 9:
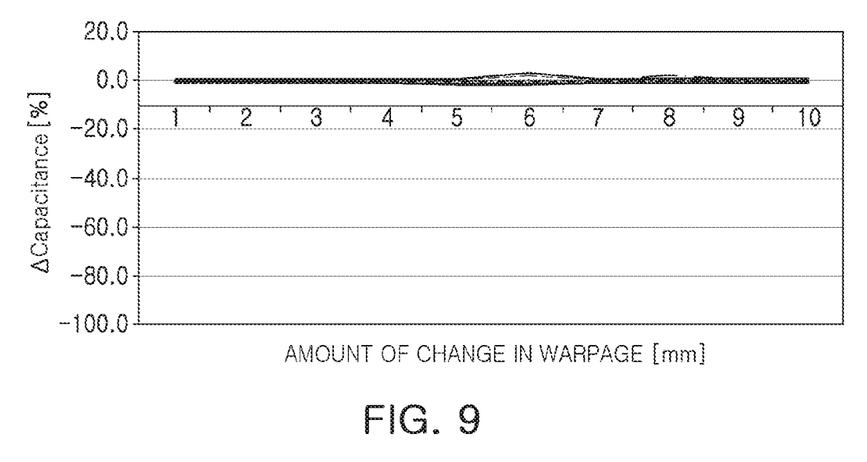
FIG. 9 is a graph illustrating a result of a warpage strength test of an electronic component according to an example embodiment of the present disclosure.

FIG. 8 is a graph illustrating a result of a warpage strength test of an electronic component of a prior art which does not include a solder fillet limiting layer. FIG. 9 is a graph illustrating a result of a warpage strength test of an electronic component according to an example embodiment.

As illustrated in FIGS. 8 and 9, in the comparative example, deterioration was observed from 5 mm, whereas in the embodiment, a height of the solder filler was less than that of the comparative example such that deterioration did not occur until 10 mm.

According to the aforementioned example embodiment, by disposing the first and second solder fillet limiting layer on an upper side of the external terminal of the interposer, warpage strength of the multilayer capacitor may be enhanced.

While the exemplary embodiments have been shown and described above, it will be apparent to those skilled in the art that modifications and variations could be made without departing from the scope of the present invention as defined by the appended claims.

What is claimed is:

1. An electronic component, comprising:
   a multilayer capacitor including a capacitor body having first and second surfaces opposing each other, third and fourth surfaces connected to the first and second surfaces and opposing each other, fifth and sixth surfaces connected to the first and second surfaces and to the third and fourth surfaces and opposing each other, and first and second external electrodes disposed on both ends of the capacitor body in a first direction in which the third and fourth surfaces of the capacitor body are connected to each other, respectively; and
   an interposer including an interposer body and first and second external terminals disposed on both ends of the interposer body opposing in the first direction, and disposed on a side of the first surface of the capacitor body, and first and second solder fillet limiting layers disposed respectively on side surfaces of the first and second external terminals in the first direction,
   wherein the capacitor body includes a plurality of dielectric layers and a plurality of first and second internal electrodes alternately disposed with the dielectric layer interposed therebetween in a second direction in which the fifth and sixth surfaces of the capacitor body are connected to each other,
   wherein the first and second internal electrodes are exposed through the third and fourth surfaces of the capacitor body, respectively,
   wherein each of the first and second external terminals includes an upper surface facing the first surface of the capacitor body, and
   wherein the first and second solder fillet limiting layers extend from the respective side surfaces of the first and second external terminals to beyond the respective upper surfaces in a third direction, in which the first and second surfaces of the capacitor body are connected to each other, without extending directly onto the respective upper surfaces.

2. The electronic component of claim 1,
   wherein the first external terminal includes a first bonding portion disposed on the interposer body and connected to the first external electrode, a first mounting portion disposed on the interposer body and opposing the first bonding portion in the third direction, and a first connection portion disposed on the interposer body and connecting the first bonding portion to the first mounting portion,
   wherein the second external terminal includes a second bonding portion disposed on the interposer body and connected to the second external electrode, a second mounting portion disposed on the interposer body and opposing the second bonding portion in the third direction, and a second connection portion disposed on the interposer body and connecting the second bonding portion to the second mounting portion,
   wherein the first solder fillet limiting layer is disposed on an external surface of an upper portion of the first connection portion and is elongated in the second direction of the capacitor body, and
   wherein the second solder fillet limiting layer is disposed on an external surface of an upper portion of the second connection portion and is elongated in the second direction.

3. The electronic component of claim 1, wherein the first and second solder fillet limiting layers comprise an organic material.

4. The electronic component of claim 2, wherein a conductive adhesive is disposed in a region between the first and second external electrodes and a region between the first and second bonding portions.

5. The electronic component of claim 4, wherein the conductive adhesive is a solder.

6. The electronic component of claim 1, wherein the first and second external electrodes have cross-sectional surfaces having a "[" shape and a "]" shape, respectively.

7. The electronic component of claim 1, wherein the interposer body comprises alumina.

8. The electronic component of claim 1, wherein the first and second external electrodes include first and second connection portions disposed on the third and fourth surfaces of the capacitor body, respectively, and first and second band portions extending from the first and second connection portions to a portion of the first surface of the capacitor body, respectively.

9. The electronic component of claim 2, further comprising:
   first and second plating layers disposed on surfaces of the first and second external electrodes, respectively,
   wherein, in the first and second external terminals, each of the first and second bonding portions and the first and second mounting portions includes a conductive layer disposed on an internal side and a plating layer disposed on an external side, and each of the first and second connection portions only includes a plating layer.

10. The electronic component of claim 9, further comprising:
    third and fourth plating layers configured to cover the first and second plating layers, respectively; and
    fifth and sixth plating layers configured to cover the first and second external terminals, respectively, and to not be disposed on the first and second solder fillet limiting layers.

11. The electronic component of claim 10,
    wherein the first and second external electrodes include copper (Cu),
    wherein each of the first and second plating layers has a dual layer structure including a nickel (Ni) plating layer disposed on an internal side and a tin (Sn) plating layer disposed on an external side,
    wherein the conductive layer disposed on the internal side of each of the first and second bonding portions and the first and second mounting portions includes cupper,
    wherein each of the plating layers of the first and second bonding portions and of the first and second mounting portions and the first and second connection portions has a dual layer structure including a nickel (Ni) plating layer disposed on an internal side and a tin (Sn) plating layer disposed on an external side, and wherein the third and fourth plating layers and fifth and sixth plating layers are configured as tin plating layers.

12. The electronic component of claim 1,
wherein a length of the interposer taken in the first direction is less than a length of the multilayer capacitor taken in the first direction, and
wherein a length of the interposer taken in the second direction is less than a length of the multilayer capacitor taken in the second direction.

13. An electronic component, comprising:
a multilayer ceramic capacitor including:
  a capacitor body,
  a first external electrode disposed on a first side surface and a bottom surface of the capacitor body, and
  a second external electrode disposed on a second side surface and the bottom surface of the capacitor body, the second external electrode being spaced apart from the first external electrode on the bottom surface, the second side surface being opposite the first side surface in a length direction; and
an interposer including:
  an interposer body,
  a first external terminal disposed on a first end of the interposer body including on a first side surface of the interposer body,
  a second external terminal disposed on a second end of the interposer body including on a second side surface of the interposer body opposing the first side surface of the interposer body, and
  first and second solder fillet limiting layers disposed respectively on upper portions of the first and second external terminals along respective side surfaces of the interposer body,
  wherein each of the first and second external terminals includes an upper surface facing the bottom surface of the capacitor body in a thickness direction, and
  wherein the first and second solder fillet limiting layers extend from the respective side surfaces of the interposer body to beyond the respective upper surfaces in the thickness direction without extending directly onto the respective upper surfaces.

14. The electronic component of claim 13, wherein the first and second solder fillet limiting layers comprise organic materials.

15. The electronic component of claim 13, wherein a length and width of the interposer is smaller than a length and width of the bottom surface of the multilayer ceramic capacitor respectively.

16. The electronic component of claim 13, wherein the first and second external terminals of the interposer electrically and physically contact portions of the first and second external electrodes disposed on the bottom surface of the multilayer ceramic capacitor respectively.

17. The electronic component of claim 13, wherein each of the first and second external terminals of the interposer has a C-shape so as to be disposed on a top, a bottom and a side surface of the interposer, the top surface of the interposer being relatively proximate to the bottom surface of the multilayer ceramic capacitor.

18. An electronic component, comprising:
a multilayer capacitor including a capacitor body having first and second surfaces opposing each other, third and fourth surfaces connected to the first and second surfaces and opposing each other, fifth and sixth surfaces connected to the first and second surfaces and to the third and fourth surfaces and opposing each other, and first and second external electrodes disposed on both ends of the capacitor body in a first direction in which the third and fourth surfaces of the capacitor body are connected to each other, respectively; and
an interposer including an interposer body and first and second external terminals disposed on both ends of the interposer body opposing in the first direction, and disposed on a side of the first surface of the capacitor body, and first and second solder fillet limiting layers disposed respectively on upper sides of both surfaces of each of the first and second external terminals in the first direction,
wherein the capacitor body includes a plurality of dielectric layers and a plurality of first and second internal electrodes alternately disposed with the dielectric layer interposed therebetween in a second direction in which the fifth and sixth surfaces of the capacitor body are connected to each other,
wherein the first and second internal electrodes are exposed through the third and fourth surfaces of the capacitor body, respectively,
wherein the first external terminal includes a first bonding portion disposed on the interposer body and connected to the first external electrode, a first mounting portion disposed on the interposer body and opposing the first bonding portion in a third direction in which the first and second surfaces of the capacitor body are connected to each other, and a first connection portion disposed on the interposer body and connecting the first bonding portion to the first mounting portion,
wherein the second external terminal includes a second bonding portion disposed on the interposer body and connected to the second external electrode, a second mounting portion disposed on the interposer body and opposing the second bonding portion in the third direction, and a second connection portion disposed on the interposer body and connecting the second bonding portion to the second mounting portion,
wherein the first solder fillet limiting layer is disposed on an external surface of an upper portion of the first connection portion and is elongated in the second direction of the capacitor body,
wherein the second solder fillet limiting layer is disposed on an external surface of an upper portion of the second connection portion and is elongated in the second direction,
wherein the electronic component further comprises first and second plating layers disposed on surfaces of the first and second external electrodes, respectively, and
wherein, in the first and second external terminals, each of the first and second bonding portions and the first and second mounting portions includes a conductive layer disposed on an internal side and a plating layer disposed on an external side, and each of the first and second connection portions only includes a plating layer.

* * * * *